United States Patent [19]

Brachet et al.

[11] 4,179,198

[45] Dec. 18, 1979

[54] INSTALLATION FOR THE ANIMATION OF PICTURES

[76] Inventors: Roland F. C. Brachet, Domaine d'Arnaga, 83810 Callian; Pierre M. Boismard, 10, rue de Castellane, 75008 Paris, both of France

[21] Appl. No.: 890,689

[22] Filed: Mar. 27, 1978

[30] Foreign Application Priority Data

Mar. 25, 1977 [FR] France ................................ 77 09086

[51] Int. Cl.² ................................................ G03B 25/00

[52] U.S. Cl. ........................................ 352/100; 40/902

[58] Field of Search .................... 40/902, 541; 352/100

[56] References Cited

U.S. PATENT DOCUMENTS

| | | | |
|---|---|---|---|
| 917,587 | 4/1909 | Good | 352/100 |
| 978,854 | 12/1910 | Czerniewski | 352/100 |
| 2,026,753 | 1/1936 | Rosenthal et al. | 352/100 |
| 2,299,731 | 10/1942 | Arendt | 352/100 X |
| 2,319,287 | 5/1943 | Arendt | 352/100 |
| 3,694,062 | 9/1972 | Koenig | 40/902 X |
| 3,704,064 | 11/1972 | Sollogoub | 40/902 X |

FOREIGN PATENT DOCUMENTS

| | | | |
|---|---|---|---|
| 2415329 | 10/1974 | Fed. Rep. of Germany | 40/902 |
| 1169154 | 9/1958 | France | 40/902 |
| 395712 | 7/1933 | United Kingdom | 352/100 |

*Primary Examiner*—John F. Pitrelli

[57] ABSTRACT

An installation for the animation of pictures for transportation systems, such as, for example, a railway system wherein a passenger vehicle moves through an unlighted area such as a tunnel. The installation comprises a series of pictures that are mounted along the side wall of the tunnel at regular intervals and at least one light-flash emitting device, the device being mounted on the passenger vehicle and directed toward the pictures. Electric circuitry causes the flash to be emitted each time the vehicle has covered a distance equal to the space between two successive pictures. The installation provides passengers riding the transportation system with animated pictures during the course of their journey.

1 Claim, 4 Drawing Figures

INSTALLATION FOR THE ANIMATION OF PICTURES

BACKGROUND OF THE INVENTION (1) Field of the Invention

The present invention relates to transportation systems, such as, for example railway systems. More particularly, the present invention relates to installations for the animation of pictures in railway systems wherein a passenger vehicle moves through a dark tunnel and it is desired to provide passengers riding in the passenger vehicle with animated pictures during their journey.

(2) Description of the Prior Art

In transportation systems, there has been a continued trend to provide the passenger in a passenger vehicle with esthetic and/or informative pictures. Presently, in railway passenger vehicles, there are many pictures posted on the interior walls of the passenger vehicles in order to advertise goods or services or to present passengers with an esthetically pleasing environment. More recently, in airline travel, motion pictures are shown to passengers riding the airplane. This type of motion picture requires a screen, a projector and personnel to run the projector.

In riding a railway such as a subway or underground, the passenger, for a substantial portion of the trip looks out onto comparatively dark and unattractive places, usually the walls of a railway tunnel.

One of the purposes of the present invention is to provide an installation which provides animated pictures to railway passengers.

Another object of the present invention is to provide an installation which does not require additional personnel on the railway vehicle in order to provide the animated pictures.

It is another object of the present invention to provide for esthetic improvement of dark and comparatively unattractive places such a railway tunnels, particularly subway and underground tunnels.

SUMMARY OF THE INVENTION:

The present invention provides an installation for the animation of pictures in transportation systems, such as a railway system, where a passenger vehicle moves through a dark tunnel. The installation comprises a series of pictures which are mounted along the wall of the tunnel at regular intervals. At least one device which provides for the emission of flashes of light is mounted on the passenger vehicle and directed toward the wall bearing the pictures. Electric circuitry is provided which causes a flash to be emitted each time the vehicle has covered a distance equal to the space between two successive pictures.

Thus, an installation for animated pictures is provided which does not require additional personnel to ride the passenger vehicle and operate the animated pictures. In this manner, esthetically pleasing animated pictures or animated advertisements can be provided to the passengers of a transportation system. Moreover, in dark and comparatively unattractive subway tunnels, a bright environment is provided which also provides the passengers of such a system with animated pictures.

Figure 1:
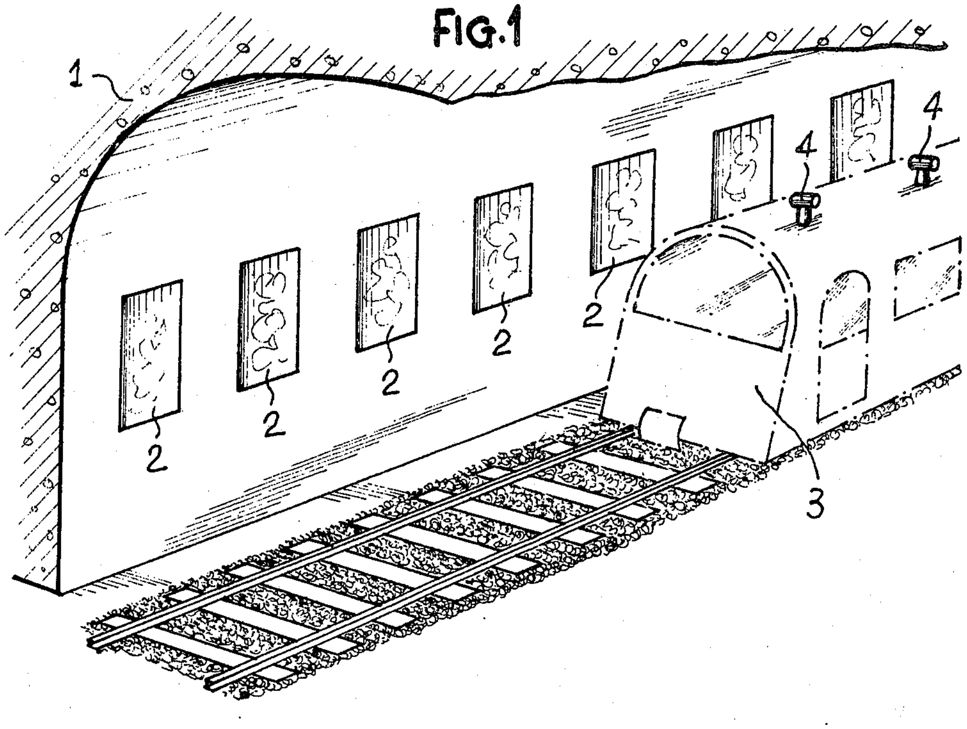
FIG. 1 is a perspective view of an installation according to the present inventions.

DETAILED DESCRIPTION OF THE INVENTION:

Referring to FIG. 1, tunnel 1 is the type which may be found in an urban underground railway and is ususally poorly lighted and esthetically unpleasing. Tunnel 1 includes a side wall which has mounted thereon pictures 2, such as advertising posters. The pictures 2 show the successive stages of a sequential motion picture such that if the pictures are viewed in rapid succession an impression of movement is encountered by the viewer. Alternatively, the pictures may be identical views. The pictures along the wall are spaced at equal distances. Preferably, the spacing of the pictures is a function of the spacing of the windows in the railway car 3 which is transported through tunnel 1.

On the roof of train 3, which is shown in broken lines and dots to indicate movement, a series of light-flash emitting devices are positioned. The light-flash emitting devices 4 comprise gas discharge tubes which are well known and may comprise a spark tube containing mercury, xenon or krypton under pressure. The light-flash emitting devices 4 are directed toward the wall of the tunnel bearing pictures 2. The light-flash emitting devices are connected to a generator capable of providing a brief electrical discharge to the light-flash emitting devices 4 by a trip circuit which will be described immediately below.

Figure 2:
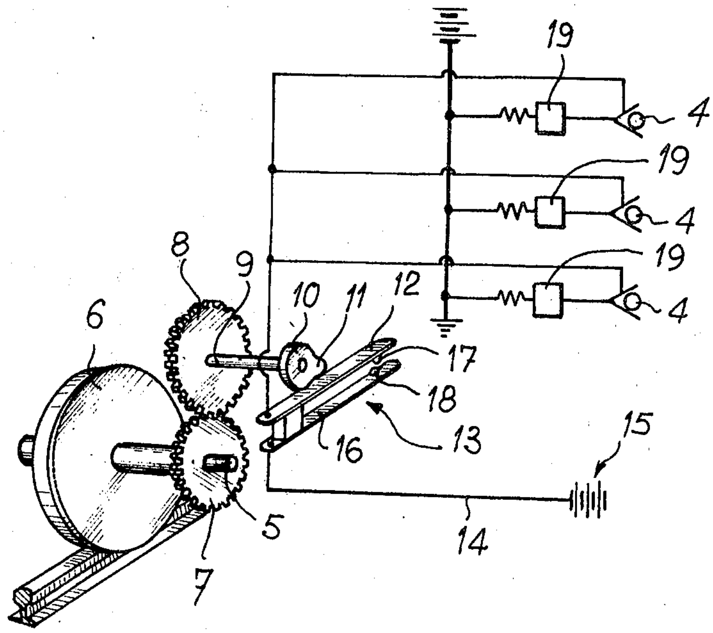
FIG. 2 is a combined schematic and perspective view of the flash actuating system of the installation shown in FIG. 1.

Referring to FIG. 2, light-flash emitting devices 4 are connected to an electrical release circuit which allows for the correct timing of the emission of the flash from light-flash emitting devices 4. The release circuitry comprises switch 13 which provides for flow of current to devices 4 at a frequency dependent upon the distance through which railway car 3 travels. Switch 13 includes an elastic blade 12 having thereon a contact 17 which is spaced from and aligned with contact 18 of fixed bar 16. A source of electrical current 15 is connected to bar 18 and elastic blade 12 is connected to light-flash emitting devices 4. Contacts 17 and 18, when touching, allow for the flow of current from supply 15 to light-flash emitting devices 4.

Switch 13 is closed periodically by the following mechanical means. Railway car 3 includes one wheel 6 which is operatively connected to pinion 7 which in turn is connected to a second pinion 8 which drives a shaft 9. A cam pin is mounted on shaft 9 and is of generally circular shape having preferably a single boss 11. The cam pin is arranged with respect to switch 13 such that boss 11 on each rotation encounters and deforms elastic blade 12 so as to close the electrical circuit and actuate light-flash emitting devices 4. The ratio between pinions 7 and 8 should be selected to cause the cam to rotate once each time the train covers the distance between two successive pictures 2.

Electrical current is provided by source 15 to switch 13 through conductor 14 which is in turn connected to light-flash emitting devices 4. Each device is also connected to a respective capacitor 19, the capacitors being fed with an independent power source.

When train 3 travels the distance between two successive pictures, the switch 13 is closed and all of the light-flash emitting devices on the train are actuated simultaneously.

The passengers in train 3 thus perceive a network of pictures which are stroboscopically illuminated. Each illumination only lasts a few microseconds so there is little risk that the passengers will preceive the impression of a string of pictures moving past them. Restated, the passengers will perceive that the pictures are accompanying them on their journey rather than perceiving that the pictures are passing them.

The above described system may be incorporated in a conventional transportation system such as a railway system. The customary cinematographic speed of the pictures relative to the train is approached by the following example:

(a) Speed of train: 10 meters per second (b) Distance between successive pictures: 0.6 meters (c) Frequency of flashes of light: 16 flashes per second.

These parameters are perfectly compatible with standard cinematographic conditions. On many urban underground railway routes, the train speed does not exceed 35 kilometers per hour. The speed at which a passenger traveling inside the train will see the pictures is a function of the speed of the vehicle. At normal traveling speed he will receive an impression similar to that given by a cinematographic performance, while at reduced traveling speeds, the passenger may receive the impression of successive but disconnected views. Thus at slower speeds, an unusual effect will be achieved. With the system of the present invention the traveler will not only see the picture exactly in front of him, but also, the traveler will see a series of pictures including those to the right and those to the left. Here again, it is clear that a set of pictures of this type will assist in producing very special effects, such as marching soldiers, ballet dancers and the like which can not be obtained with conventional pictures.

Figure 3:
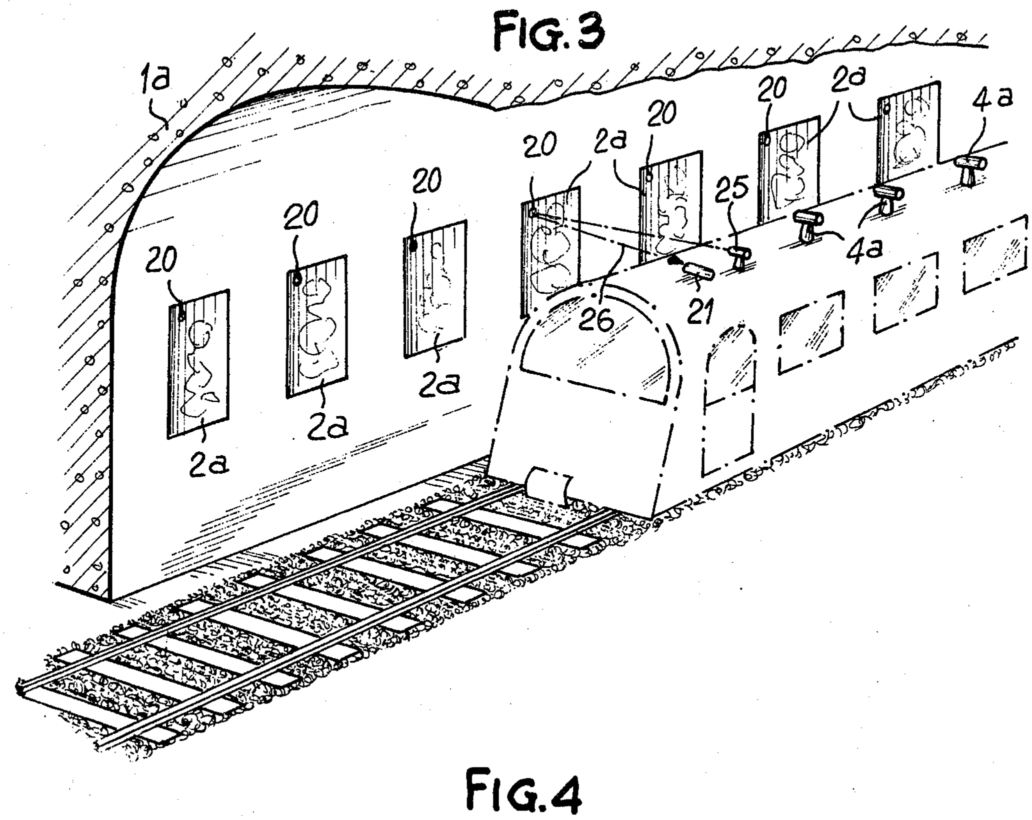
FIG. 3 is a perspective view of an alternative embodiment of the present invention.
Figure 4:
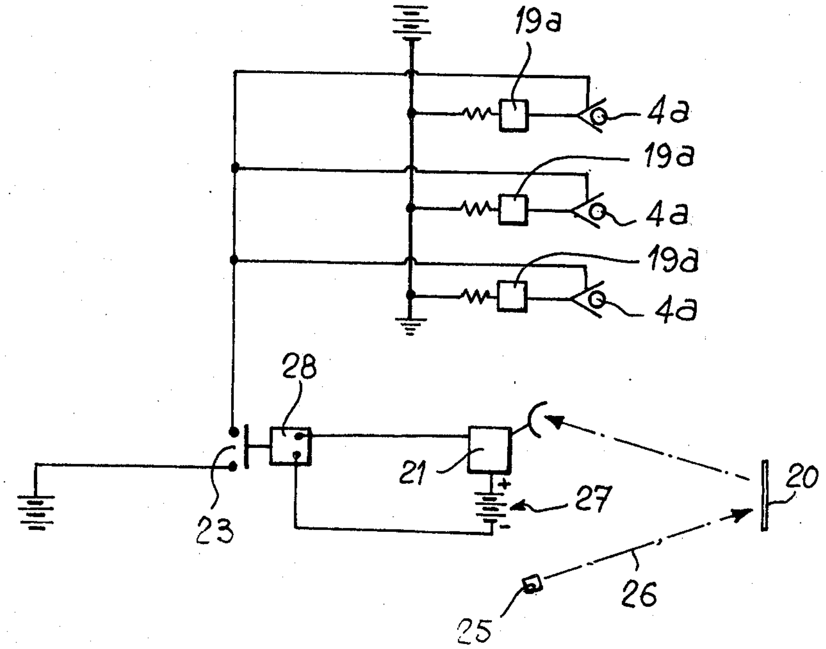
FIG. 4 is a schematic of the flash actuating system of the installation shown in FIG. 3

FIGS. 3 and 4 show an alternative embodiment of the invention. The wall of a tunnel 1*a* bears pictures 2*a* positioned equal distances apart. Each picture bears a small reflecting plate 20. The train 3*a* is fitted with light-flash emitting devices 4*a* directed toward the wall of the tunnel 1*a* bearing the pictures 2*a*. A projector 25 is mounted on the roof of the train 3*a* and is connected to a suitable source of electric power in order to direct a pencil of light 26 toward reflecting plates 20. A photo electric cell 21 is mounted on the train in a suitable position to receive the pencil of light 26 reflected by reflecting plate 20.

Referring to FIG. 4, the flashing of light-flash emitting devices 4*a* is controlled as follows: the anode of photo electric cell 21 is connected to the positive pole of a suitable source of electrical current 27, while the cathode is connected to an amplifier 28. Amplifier 28 is connected to the negative pole of electrical current source 27. The amplifier 28 controls a switch 23 connected to the trip circuit of light-flash emitting devices 4*a*. The circuitry includes a plurality of capacitors 9*a*, each aligned with its respective light-flash emitting device 4*a*, the capacitors being fed from an independent current source. In the embodiment shown in FIGS. 3 and 4, as the train travels through a certain distance, the light-flash emitting devices will periodically flash on the pictures 2*a* to produce the same effects as obtained with the embodiment shown in FIGS. 1 and 2.

While preferred embodiments have been shown and described, various modifications and substitutions may be made thereto without departing from the spirit and scope of the invention. Accordingly, it is to be understood that the present invention having been described by way of illustration and not limitation.

What is claimed is:

1. An installation for the animation for pictures for transportation systems such as railway systems and the like wherein a passenger vehicle moves along a path with respect to a generally parallel tunnel wall, said installation comprising:

a series of stationary pictures mounted along the path of travel of the passenger vehicle, said pictures being spaced apart by a predetermined interval;

a plurality of light emitting devices mounted on the vehicle in spacially displaced locations along the length of the vehicle;

normally inoperative means for simultaneously actuating all of said light emitting devices; and control means for periodically operating said actuating means, said control means being responsive to the motion of the vehicle to cause actuation of said light emitting devices when the vehicle has travelled a distance equal to the predetermined interval between the stationary pictures whereby each time said actuating means is operated a plurality of stationary pictures spanning a distance commensurate with the length of the vehicle will be illuminated.

* * * * *